United States Patent [19]
Yuyama et al.

[11] Patent Number: 4,978,702
[45] Date of Patent: Dec. 18, 1990

[54] COATING COMPOSITION

[75] Inventors: Masahiro Yuyama; Masahiko Moritani; Mikio Futagami, all of Niihama, Japan

[73] Assignee: Sumitomo Chemical Company, Limited, Osaka, Japan

[21] Appl. No.: 237,690

[22] Filed: Aug. 26, 1988

Related U.S. Application Data

[63] Continuation of Ser. No. 98,471, Sep. 18, 1987, abandoned.

[30] Foreign Application Priority Data

Sep. 18, 1986 [JP] Japan ............................. 61-220319

[51] Int. Cl.$^5$ ............................................. C08K 5/50
[52] U.S. Cl. ................................. 524/266; 524/588; 524/731; 524/858; 524/860; 528/10; 528/14; 528/18; 528/21; 528/39
[58] Field of Search ............... 524/858, 860, 588, 731, 524/266; 528/39, 10, 14, 18, 21

[56] References Cited

U.S. PATENT DOCUMENTS

| | | | |
|---|---|---|---|
| 3,668,180 | 6/1972 | Brennan et al. | 528/14 |
| 3,914,199 | 10/1975 | Lee et al. | 524/588 |
| 3,986,997 | 10/1976 | Clark | 528/32 |
| 4,049,861 | 9/1977 | Nozari | 528/23 |
| 4,113,665 | 9/1978 | Law et al. | 524/863 |
| 4,177,315 | 12/1979 | Ubersax | 524/588 |
| 4,224,211 | 9/1980 | Kanazawa et al. | 525/100 |
| 4,296,228 | 10/1981 | Innertsberger et al. | 524/588 |
| 4,309,319 | 1/1982 | Vaughn et al. | 524/588 |
| 4,355,135 | 10/1982 | January | 528/23 |
| 4,382,983 | 5/1983 | Yuyama et al. | 528/14 |
| 4,486,503 | 12/1984 | Vaughn | 524/588 |
| 4,500,669 | 2/1985 | Ashlock et al. | 524/863 |
| 4,539,351 | 9/1985 | O'Malley et al. | 524/588 |
| 4,615,947 | 10/1986 | Goossens | 525/100 |
| 4,624,870 | 11/1986 | Anthony | 524/588 |

Primary Examiner—Melvyn I. Marquis
Assistant Examiner—R. Dean, Jr.
Attorney, Agent, or Firm—Birch, Stewart, Kolasch & Birch

[57] ABSTRACT

A coating composition is disclosed which includes (A) 15 to 65% by weight (calculated as $SiO_2$) of colloidal silica, a partially hydrolyzed and partially co-condensed product of the following component (B) and component (C):

(B) 10 to 80% by weight (calculated as $R^1Si(OH)_3$) of a trialkoxysilane of the formula: $R^1Si(OR^2)_3$ wherein the group $R^1$ is methyl or vinyl and the group $R^2$ is alkyl having 1 to 4 carbon atoms, (C) 1 to 50% by weight (calculated as $R^3{}_nSi(OH)_{4-n}$) of an acetoxysilane of the formula: $R^3{}_nSi(OCOCH_3)_{4-n}$ wherein the group $R^3$ is alkyl having 1 to 3 carbon atoms, vinyl, phenyl, or mercaptoalkyl having 1 to 3 carbon atoms, and n is an integer of 0 to 2, provided that the total amount of the component (B) wherein the group $R^1$ is methyl and the component (C) wherein the group $R^3$ is methyl and n is 1 is in the range of from 10% by weight to less than 70% by weight based on the whole amount of the components (B) and (C), and (D) a solvent.

The composition is useful for coating plastic articles and metallic articles to improve their surface properties such as surface hardness, chemical resistance, etc.

6 Claims, No Drawings

COATING COMPOSITION

This application is a continuation of application Ser. No. 098,471 filed on Sep. 18, 1987, now abandoned.

This invention relates to a coating composition useful for improvement of surface properties such as surface hardness, chemical resistance, etc. of plastic articles or metallic articles.

PRIOR ART

There have recently been used various plastic articles to replace glass articles. For instance, shaped articles of polymers such as polycarbonate, polymethyl methacrylate, etc. have been used in a wide range of utilities such as lens for glasses and other optical devices, window glass for buildings, window glass for transporting means such as trains, automobiles, lump covers, and the like, because of excellent properties, such as transparency, light weight, easy processability, and impact resistance.

However, these plastic articles have low surface hardness and less solvent resistance, and hence, the surface is easily injured by rubbing and easily swollen or dissolved by contacting with solvents. Furthermore, the surface of low-hardness metals such as aluminum, or the surface of plastics and metals coated with paints is easily injured by rubbing with steel wool or sand, and it is also injured during use and loses luster.

In order to eliminate these drawbacks, it has been proposed to coat them with various hardening resins, but there has never been found any satisfactory method.

The present inventors had previously tried to improve the surface hardness of the plastic articles by applying a paint thereto and had found that a composition comprising co-partial hydrolyzates of tetraalkoxysilane and organic silicon compound and/or a mixture of each hydrolyzate, an acrylic polymer and an etherified methylolmelamine can give excellent surface hardness (cf. Japanese Pat. First Publication (Kokai) No. 33128/1976, U.S. Pat. Nos. 4,028,300 and 4,190,699) and further that a composition comprising the same components as the above-mentioned application except the contents thereof are varied can give a coating film having well balanced surface hardness and physicochemical properties of hot water resistance, heat cycle resistance, weatherability (cf. Japanese Pat. Second Publication (Kokoku) No. 33858/1985, U.S. Pat. No. 4,224,211).

The coating compositions of these patents can be used in practical applications, but are still inferior to glass in surface hardness and durability.

Japanese Pat. Second Publication (Kokoku) No. 39691/1977 (U.S. Pat. No. 3,986,997) and Japanese Pat. First Publication (Kokai) No. 94971/1980 (GB Pat. No. 2,036,053) disclose coating compositions comprising as the main components colloidal silica and partial hydrolyzate of methyltrimethoxysilane. The compositions can give a coating film having sufficient hardness, but the coating film has less flexibility and less adhesion to plastic articles, and further, it requires too much time until the coating film shows sufficient hardness.

Japanese Pat. First Publication (Kokai) No. 177079/1985 discloses a coating composition comprising colloidal silica, a hydrolytic condensation product of organotrialkoxysilane, a specific curing catalyst which can cure the product at a comparatively low temperature within a short period of time, and a solvent. The composition is, however, insignificantly produced in a short period of time, because aging step for several weeks is required for the preparation of such composition.

SUMMARY OF THE INVENTION

The present inventors have conducted intensive studies to develop an improved coating composition which can produce a coating film having excellent surface hardness and adhesion, and also excellent durability, in hot water resistance, weatherability, heat cycle resistance, etc. by heating in a short period of time with high productivity, and have found that the desired coating composition can be obtained by using a specific combination of colloidal silica, a partial hydrolytic condensation product of alkyltrialkoxysilane, and a partial hydrolytic condensation product of acetoxysilane (a partially hydrolyzed and a partially co-condensed product of trialkoxysilane and acetoxysilane).

An object of the present invention is to provide an improved coating composition which is useful for improving and surface conditions such as surface hardness, chemical resistance, of plastic articles or metallic articles.

Another object of the present invention is to provide a coating composition which can form a coating film having well balanced properties within a short period of time.

These and other objects and advantages of the present invention will be apparent to those skilled in the art from the following description.

DETAILED DESCRIPTION OF THE INVENTION

The coating composition of the invention comprises:

(A) 15 to 65% by weight (calculated as SiO$_2$, hereinafter the same) of colloidal silica, a partially hydrolyzed and partially co-condensed product of the following component (B) and component (C):

(B) 10 to 80% by weight (calculated as R$^1$Si(OH)$_3$, hereinafter the same) of a trialkoxysilane of the formula: R$^1$Si(OR$^2$)$_3$, (C) 1 to 50% by weight (calculated as R$^3{}_n$Si(OH)$_{4-n}$, hereinafter the same) of an acetoxysilane of the formula: R$^3$Si(OCOCH$_3$)$_{4-n}$, provided that the total amount of the component (B) wherein R$^1$ is methyl and of the component (C) wherein R$^3$ is methyl and n is 1 is in the range of from 10% by weight to less than 70% by weight based on the whole amount of the components (B) and (C), and (D) a solvent.

The colloidal silica (A component) is commercially available in the form of an aqueous or alcoholic dispersion containing silica particles having a particle size of 5 to 15 mμ. Such products can be used as they stand. Examples of these commercially available products are "Adelite ®" (manufactured by Asahi Denka Kogyo K.K., Japan), "Snowtex ®" (manufactured by Nissan Chemical Industries, Ltd., Japan), "Cataloid ®" (manufactured by Catalysts & Chemicals Industries Co., Ltd., Japan), and "Rudox ®" (manufactured by E.I. DuPont, U.S.A.).

The colloidal silica includes both acidic and basic products, and is incorporated in an amount of 15 to 65% by weight, preferably 20 to 55% by weight, (calculated as the solid component SiO$_2$).

The incorporation of the colloidal silica is essential in order to give the composition the desired surface hardness. When it is used in an amount of less than the above lower limit, the coating film formed from the coating composition has insufficient surface hardness, and further, the coating composition has undesirably shorter pot life. On the other hand, when the amount exceeds the above upper limit, the coating film obtained from the composition shows lower flexibility and less hot water resistance and is liable to be easily cracked or blushed.

In a trialkoxysilane of the formula: $R^1Si(OR^2)_3$ (B component), the group $R^1$ means methyl or vinyl, which is essential in order to obtain a coating film having excellent surface hardness with excellent flexibility, but $R^1$ may also include other groups unless the other groups affect the properties of the coating film. The group $R^2$ means an alkyl having 1 to 4 carbon atoms, such as methyl, ethyl, isopropyl, n-butyl, and t-butyl. The group $R^2$ releases the corresponding alcohol when hydrolyzed, and the produced alcohol precipitates at least a part of the solvent (alcohol component) contained in the coating composition.

The component (B) is incorporated in an amount of 10 to 80% by weight, preferably 20 to 70% by weight. This component is used in order to give the coating film the desired balance between surface hardness and durability, and when the amount is less than the above lower limit, the coating film does not show the desired hardness and is liable to show lower hot water resistance and weatherability and hence to be easily cracked. On the other hand, when the amount is over the above upper limit, the coating film is disadvantageously inferior both in surface hardness and in adhesion.

In an acetoxysilane of the formula: $R^3{}_nSi(OCOCH_3)_{4-n}$ (C component), the group $R^3$ means at least one of the groups selected from an alkyl having 1 to 3 carbon atoms, vinyl, phenyl, and a mercaptoalkyl, and n is an integer of from 0 to 2. The most preferred n is 1, because when n is 1, the properties of the coating film are most improved without deterioration of surface hardness. $R^3$ is preferably a methyl or a vinyl group, and particularly preferably is a vinyl group. When $R^3$ is one of these groups, the coating film obtained shows excellent flexibility while retaining excellent surface hardness.

The partial hydrolytic condensation product (C) is incorporated in an amount of 1 to 50% by weight, preferably 3 to 35% by weight. The (C) component is essential for imparting excellent adhesion to the coating film so that the coating film shows well balanced properties between surface hardness and the durability, and further, it is effective for shortening the curing time of the coating film, which is also advantageous from the viewpoint of productivity. When the (C) component is used in an amount less than the above lower limit, the desired adhesion is not exhibited and hence the coating film is inferior both in the surface hardness and in the hot water resistance. On the other hand, when the amount is over the above upper limit, the coating film is liable to be easily blushed, and the coating composition has disadvantageously a shorter pot life.

The total amount of the component (B) wherein $R^1$ is a methyl group and the component (C) wherein $R^3$ is a methyl group and n is 1, is in the range of from 10% by weight to less than 70% by weight, preferably 30 to 50% by weight, based on the whole amount of the whole components (B) and (C). When the above total amount of the specific components (B) and (C) is less than the above lower limit, the coating film exhibits insufficient surface hardness and is liable to have lower weatherability (to be cracked). On the other hand, when the amount exceeds the above upper limit, the coating film is liable to have lower weatherability, which results in undesirable cracking, low adhesion and low hardness of the coating film.

The coating composition of this invention can be prepared by the following procedure.

First, an alkyltrialkoxysilane and acetoxysilane are added to a prescribed amount of colloidal silica dispersion, and the mixture is stirred with heating, by which the former two compounds are partially hydrolyzed and simultaneously partially condensed. The hydrolysis can proceed very easily and mildly without using any catalyst and further without gelation or any other problem. The addition of the alkyltrialkoxysilane and acetoxysilane to the colloidal silica dispersion is preferably done dropwise in view of more improvement of the properties of the coating film.

The commercially available colloidal silica dispersions have usually a solid component of 20 to 40% by weight, and the commercially available products can be used as they stand. When the colloidal silica dispersion has a higher concentration of the solid component, the final coating composition has less water content, which is advantageous because there can be omitted a step of distillation of water which is required for regulating the water content in the final product.

The above partial hydrolytic condensation reaction is carried out at a temperature of 20 to 100° C., preferably 50 to 90° C., for 0.5 to 5 hours, preferably 1 to 3 hours.

The partial hydrolytic condensation products thus obtained are directly diluted with a solvent including a lower fatty alcohol without any intermediate step such as distillation of alcohol and water produced. The mixture is optionally incorporated with other additives such as curing promoter catalysts, surfactants and the like, and the mixture is filtered to give the desired coating composition.

The solvent used for preparing the coating composition includes alcohols (e.g. methanol, ethanol, propanol, butanol, etc.), ketones (e.g. acetone, methyl ethyl ketone, etc.), esters (e.g. ethyl acetate, butyl acetate, etc.), ethers (e.g. diethyl ether, dipropyl ether, dioxane, etc.), cellosolves (e.g. methyl cellosolve, butyl cellosolve, cellosolve acetate, etc.), halogenated products (e.g. halogenated hydrocarbons such as trichlorethane, etc.), carboxylic acids (e.g. lower alkylcarboxylic acids having 1 to 4 carbon atoms, such as formic acid, acetic acid, propionic acid, etc.), aromatic compounds (e.g. benzene, toluene, xylene, etc.), and the like, which may be used alone or in a combination of two or more thereof. The most suitable solvent is selected depending on the used polymer materials, evaporation speed, and the like.

The lower alkylcarboxylic acids (e.g. formic acid, acetic acid, etc.) are particularly preferable because they are effective for imparting to the coating film excellent adhesion to the substrate. Other preferred solvents are combinations of lower alcohols (e.g. methanol, ethanol, propanol, or butanol), lower alkylcarboxylic acids (e.g. formic acid, acetic acid, or propionic acid), aromatic compounds (e.g. benzene, toluene, or xylene), and cellosolves (e.g. methyl cellosolve, butyl cellosolve, or cellosolve acetate).

The amount of the solvent may vary depending on the desired thickness of the coating film or the coating manner of the composition, but is usually present in such an amount that the concentration of the silicon compound in the final coating composition becomes in the range of 10 to 50% by weight, preferably 15 to 25% by weight.

The coating composition of this invention can produce a coating film by coating on a substrate and baking at a temperature of 70° C or higher. In order to lower the curing temperature, the coating composition may be incorporated with a curing promoter catalyst, such as acids (e.g. hydrochloric acid, toluenesulfonic acid, etc.), organic amines (e.g. triethylamine, etc.), metal salts of organic carboxylic acids (e.g. sodium acetate, etc.), metal thiocyanates (e.g. sodium thiocyanate, etc.), metal nitrites (e.g. sodium nitrite, potassium nitrite, calcium nitrite, etc.), organic tin compounds (e.g. dibutyl tin dilaurate, etc.), and the like.

Moreover, for the purpose of obtaining a coating film having a particularly high thickness, the coating composition may also be incorporated with surfactants (particularly, a small amount of a block copolymer of an alkyleneoxide and dimethylsiloxane) in order to prevent an undesirable surface state such as orange peel or shrinkage, and also to prevent cissing of the coating film. These curing promoter catalysts and surfactants can be used only in a small amount, for example, in an amount of 5% by weight or less, by which the desired effects can be exhibited.

The coating composition of this invention can be applied to the substrate by any conventional method, such as spraying, dipping, brushing, and the like. After coating, the coated composition is cured by baking at a temperature of 70° C. or higher, and thereby, there is formed the desired coating film having excellent properties, such as transparency, hardness, water resistance, hot water resistance, chemical resistance, heat cycle resistance, and weatherability.

The coating composition of this invention is particularly useful for application to acrylic substrates, but it is also useful for application to other plastic substrates, such as polycarbonate, polystyrene, polyvinyl chloride, ABS resins, and the like, and also to paper, wooden, metallic, and ceramic substrates.

As to the substrates having less adhesion, the substrates may previously be under-coated with an acrylic primer such as a solution of polymethyl methacrylate in a solvent, a conventional acrylic lacquer, a thermosetting acrylic paint, or the like, by which the desired adhesion is well exhibited.

The coating composition of this invention can yield the desired coating film having excellent surface hardness and adhesion and further excellent durability in hot water resistance, weatherability, heat cycle resistance, and the like, within a short period of time, and the coating composition can be prepared in high productivity.

This invention is illustrated by the following Examples and Reference Examples, but should not be construed to be limited thereto. In Examples and Reference Examples, "%" means % by weight, unless specified otherwise.

EXAMPLES 1 to 10 AND REFERENCE EXAMPLES 1 to 10

(1) Preparation of coating composition:

A vessel for hydrolysis provided with a reflux condenser was charged with the (A) component, a: Adelite ® AT-30S (manufactured by Asahi Denka Kogyo K.K., Japan) or b: Adelite ® AT-30 (manufactured by the same company as above) in the kinds and amounts as shown in Table 1, and while stirring the mixture at a bath temperature of 60° C., at 200 r.p.m., there was added dropwise a mixture of the (B-1) component: $CH_3Si(OC_2H_5)_3$, the (B-2) component: $CH_2=CHSi(OC_2H_5)_3$, and the (C) component: $CH_2=CHSi(OCOCH_3)_3$ in the amounts as shown in Table 1 over a period of time of one hour, and the mixture was continuously stirred with heating for one hour to give co-partial hydrolytic condensation products.

The compositions of the co-hydrolytic condensation products (silicon compound) are shown in Table 1.

To the co-hydrolytic condensation product (100 parts by weight) was added a solvent mixture consisting of n-butanol (50%), isopropanol (40%) and cellosolve acetate (10%) in such an amount that the concentration of the cohydrolytic condensation product became 20%, and to the mixture were further added sodium acetate (0.6 part by weight) and a surfactant SH-28PA (manufactured by Toray Silicone K.K., Japan) (0.6 part by weight), and the resulting mixture was filtered with a filter made of 1 glass fiber to give the desired coating compositions. All products had a solid component of 20%.

(2) Coating with the compositions and testing of the properties of the coated products:

A polymethyl methacrylate sheet plate (thickness 3 mm, Sumipex ® 000, manufactured by Sumitomo Chemical Company, Limited, Japan) was washed with water and ethanol, and thereto the above coating compositions were applied by dipping method at 23° C., 55% relative humidity. The coated product was cured by drying with a hot air dryer of 100° C. for 2 hours.

The thus coated polymethyl methacrylate plate was subjected to observation of appearance and also to the following tests.

(i) Adhesion test by a cross-hatch test:

A number of nicks which reach to the substrate were made in the coating film by a reticulate knife so that a hundred cells having an area of 1 $mm^2$ were formed, and thereon was bonded a cellophane tape (manufactured by Sekisui Chemical Co., Ltd., Japan). Thereafter, the cellophane tape was strongly torn up at an angle of 90° against the coating film. The adhesion was evaluated by the number of cells remaining untorn/100 cells.

(ii) Surface hardness:

it was tested by pencil hardness, steel wool hardness, and Taber abrasion test.

(a) Pencil hardness: The surface as scratched with a pencil hardness tester at a load of 1 kg, and it was shown by the maximum pencil hardness giving no scratch. The uncoated product (control) showed the pencil hardness of 5H.

(b) Steel wool hardness: The surface of the coated product was rubbed with a commercially available 000 steel wool, and the resulting surface was observed by naked eyes and was evaluated by the degree of scratchability which was graded as follows:

A: No scratch
B: A few scratches
C: A plenty of scratches

The uncoated product (control) showed the grade of C.

(c) Taber abrasion test: The surface of the coated product was rubbed with a Taber abrasion tester (truck wheel CS-10F, load: 500 g, abrasion cycle: 500 cycle), and the haze was measured by a haze meter. The result was evaluated by the increasing degree of haze: $\Delta H$ (%). The uncoated product (control) showed $\Delta H$ of 38%.

(iii) Hot water resistance:

The coated product was dipped in boiling water for one hour, and the appearance and adhesion property of the coating film were observed.

(iv) Weatherability:

The sample was irradiated with a sunshine weather meter (WE-SUN-HCA-1 type, manufactured by Suga Shikenki K.K., Japan) for 2,000 hours, and thereafter, the state of the coating film was evaluated by the appearance, adhesion and steel wool hardness.

The above results are shown in Table 2. The compositions of Reference Examples 2, 3, 6, 9 and 10 were turbid and could not be used for coating, and hence, the products were not tested.

TABLE 1

| Ex. No. | Composition of silicon compound (part by weight) | | | | |
|---|---|---|---|---|---|
| | (A) Kind | (B) 1 | (B) 2 | (C) | $\frac{(B-1)}{(B)+(C)}$ |
| Ex. 1 | a | 26.7 | 47.4 | 21.5 | 64.7 |
| Ex. 2 | b | 26.7 | 47.4 | — | 64.9 |
| Ex. 3 | b | 42.0 | 37.7 | 10.2 | 65.0 |
| Ex. 4 | b | 42.0 | 37.7 | — | 65.0 |
| Ex. 5 | b | 42.0 | 24.0 | — | 41.4 |
| Ex. 6 | b | 59.0 | 26.7 | — | 65.2 |
| Ex. 7 | b | 26.9 | 29.9 | 21.6 | 40.9 |
| Ex. 8 | b | 42.0 | 24.0 | 22.8 | 41.4 |
| Ex. 9 | b | 20.0 | 15.0 | 50.0 | 18.8 |
| Ex. 10 | b | 55.0 | 15.0 | 5.0 | 33.3 |
| Ref. Ex. 1 | a | 31.1 | 40.1 | 28.8 | 58.2 |
| Ref. Ex. 2 | b | 55.0 | 15.0 | 30.0 | 33.3 |
| Ref. Ex. 3 | b | 10.0 | 58.1 | 11.9 | 64.6 |
| Ref. Ex. 4 | b | 68.5 | 20.5 | — | 65.0 |
| Ref. Ex. 5 | b | 27.0 | — | 51.0 | 0 |
| Ref. Ex. 6 | b | 10.0 | 58.1 | 31.9 | 64.6 |
| Ref. Ex. 7 | b | 27.0 | 5.0 | 13.0 | 6.8 |
| Ref. Ex. 8 | b | 42.0 | 52.0 | — | 89.6 |
| Ref. Ex. 9 | b | 26.6 | 65.4 | 4.0 | 89.1 |
| Ref. Ex. 10 | b | 26.4 | 73.6 | — | 100 |

What is claimed is:

1. A coating composition which comprises:
   (A) 15 to 65% by weight calculated as $SiO_2$ of colloidal silica;
   a partially hydrolyzed and partially co-condensed product of the following component (B) and component (C):
   (B) 10 to 80% by weight calculated as $R^1Si(OH)_3$ of a trialkoxysilane of the formula: $R^1Si(OR^2)_3$ wherein $R^1$ is methyl or vinyl and $R^2$ is alkyl having 1 to 4 carbon atoms;
   (C) 3 to 35% by weight calculated as $R^3{}_nSi(OH)_{4-n}$ of an acetoxysilane of the formula: $R^3{}_nSi(OCOCH_3)_{4-n}$ wherein $R^3$ is vinyl, and n is 1, provided that the amount of component (B) wherein $R^1$ is methyl is in the range of from 10% by weight to less than 70% by weight based on the whole amount of components (B) and (C): and
   (D) a solvent.

2. The composition according to claim 1, wherein component (A) calculated as $SiO_2$ and component (B) calculated as $R^1Si(OH)_3$ are incorporated in an amount of from 20 to 55% by weight and from 20 to 70% by weight, respectively.

3. The composition according to claim 1, further comprising a curing promoter catalyst.

4. The composition according to claim 3, wherein said curing promoter catalyst is selected from the group consisting of acids, organic amines, metal salts of organic carboxylic acids, metal thiocyanates, metal nitrites, and organic tin compounds.

5. The composition according to claim 1, further comprising a surfactant.

6. The composition according to claim 5, wherein said surfactant is a block copolymer of an alkyleneoxice and dimethylsiloxane.

* * * * *

TABLE 2

| Ex. No. | Appearance | Adhesion | Surface hardness | | | Hot water resistance | | Weatherability | | |
|---|---|---|---|---|---|---|---|---|---|---|
| | | | Pencil | Steel wool | Taber abrasion | Appearance | Adhesion | Appearance | Adhesion | Hardness |
| Ex. 1 | Good | 100/100 | 7H | A | 1.5 | Good | 100/100 | Good | 100/100 | A |
| Ex. 2 | Good | 100/100 | 7H | A | 1.1 | Good | 100/100 | Good | 100/100 | A |
| Ex. 3 | Good | 100/100 | 7H | A | 1.7 | Good | 100/100 | Good | 100/100 | A |
| Ex. 4 | Good | 100/100 | 7H | A | 2.7 | Good | 100/100 | Good | 100/100 | A |
| Ex. 5 | Good | 100/100 | 7H | A | 2.4 | Good | 100/100 | Good | 100/100 | A |
| Ex. 6 | Good | 100/100 | 7H | A | 3.5 | Good | 100/100 | Good | 100/100 | A |
| Ex. 7 | Good | 100/100 | 6H | A | 4.7 | Good | 100/100 | Good | 100/100 | A |
| Ex. 8 | Good | 100/100 | 7H | A | 1.8 | Good | 100/100 | Good | 100/100 | A |
| Ex. 9 | Good | 100/100 | 6H | B | 26.8 | Good | 100/100 | Good | 100/100 | B |
| Ex. 10 | Good | 100/100 | 7H | A | 4.0 | Good | 100/100 | Good | 100/100 | A |
| Ref. Ex. 1 | Blush | 100/100 | 6H | B | 20 | Blush | 100/100 | Good | 80/100 | C |
| Ref. Ex. 2 | Turbid | — | — | — | — | — | — | — | — | — |
| Ref. Ex. 3 | Turbid | — | — | — | — | — | — | — | — | — |
| Ref. Ex. 4 | Blush | 0/100 | 7H | C | 3.3 | Blush | 0/100 | Crack | 0/100 | C |
| Ref. Ex. 5 | Good | 100/100 | 6H | B | 24.8 | Good | 100/100 | Crack | 100/100 | B |
| Ref. Ex. 6 | Turbid | — | — | — | — | — | — | — | — | — |
| Ref. Ex. 7 | Good | 100/100 | 6H | B | 22.0 | Good | 100/100 | Crack | 100/100 | B |
| Ref. Ex. 8 | Good | 96/100 | 7H | A | 0.7 | Crack | 23/100 | Crack | 0/100 | C |
| Ref. Ex. 9 | Turbid | — | — | — | — | — | — | — | — | — |
| Ref. Ex. 10 | Turbid | — | — | — | — | — | — | — | — | — |